United States Patent Office 3,014,033
Patented Dec. 19, 1961

3,014,033
DERIVATIVES OF TETRAIODOPHTHALAMIC ACID
Alexander Bertus Arnold Jansen, Havant, and Thomas Ronald Carrington, Gerrards Cross, England, assignors to Glaxo Laboratories Limited, Greenford, England, a British company
No Drawing. Filed Mar. 17, 1959, Ser. No. 799,836
Claims priority, application Great Britain Mar. 26, 1958
13 Claims. (Cl. 260—247.2)

This invention relates to new compounds useful as X-ray contrast agents, in particular as contrast agents of use in cholecystography.

An ideal cholecystographic contrast agent should, in general, be relatively opaque to X-rays and concentrate in the gall bladder after administration. The compound should be substantially non-toxic at the dosage administered and cause no side-reactions.

One compound which has hitherto been used in cholecystography is α-phenyl-β-(4-hydroxy-3:5-diiodophenyl) propionic acid or pheniodol but, on oral administration, this compound often gives rise to undesirable side effects, for example diarrhoea or nausea. A more recently introduced cholecystographic agent is α-ethyl-β-(3-amino-2:4:6-triiodophenyl)-propionic acid or telepaque which is somewhat less toxic than pheniodol and has the advantage of having a higher percentage of iodine in the molecule.

We have now found that certain derivatives of tetraiodophthalamic acid are particularly effective cholecystographic agents and possess the advantage over pheniodol and telepaque in being capable of simple synthesis from readily available starting material. Many of the compounds are less toxic than pheniodol and telepaque and many of them have a higher percentage of iodine in the molecule. In general, we have found that the compounds of the invention produce good opacity in the gall bladder within 8 to 12 hours after oral administration.

According to the present invention, therefore, we provide, as new compounds, compounds of the general formula:

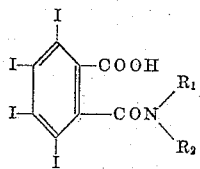

(where $R_1$ and $R_2$, which may be the same or different, each represent an alkyl group, preferably containing from 1 to 8 carbon atoms, or an aryl or aralkyl group, preferably containing from 6 to 12 carbon atoms, any of such groups bieng, if desired, substituted by one or more hydroxyl groups, halogen atoms, alkyl or alkoxy groups; or $R_1$ represents a hydrogen atom and $R_2$ has one of the above defined meanings or $R_1$ and $R_2$ form, together with the nitrogen atom, a heterocyclic ring, which may be substituted and which may, if desired, contain further hetero atoms, for example a morpholine or piperidine ring) and their non-toxic, particularly water-soluble, salts.

It is preferable, in order to maintain a high iodine content in the molecule, that the total molecular weight of the two groups $R_1$ and $R_2$ should be less than 90.

Where the new compounds are to be presented in aqueous solution, particularly suitable salts, having regard to their solubility, are the salts formed with alkali metals, e.g. sodium, or with ammonia, diethanolamine or N-methylglucamine.

A particularly effective compound according to the invention is 2-carboxy-3:4:5:6-tetraiodobenzodiethylamide ($R_1=R_2=C_2H_5$). This compound has a particularly favourable ratio of radiological effectiveness to toxicity. It is much less toxic than pheniodol or telepaque. Other compounds of especial interest are the morpholide ($R_1+R_2+N$=morpholine), the isopropylamide ($R_1=H$, $R_2$=isopropyl) and the di-n-propylamide ($R_1=R_2$=n-propyl). All these specific compounds, including the diethylamide, produce less side-reactions on administration and have a greater iodine content than the above-mentioned previously proposed contrast agents.

The compounds according to the invention may be prepared in any convenient way. One general method which may be employed is the reaction of 3:4:5:6-tetraiodophthalic anhydride with an amine, other than methylamine, of the formula $R_1$—NH—$R_2$, where $R_1$ and $R_2$ have the meanings stated above, the reaction is preferably carried out in the presence of an inert solvent for the tetraiodophthalic anhydride. Methylamine, however, reacts anomalously in the above reaction to give N-methyltetraiodophthalimide, but the latter compound can be converted to the desired phthalamic acid by alkaline hydrolysis followed by acidification, if the free acid is desired.

In general, the most suitable inert solvents for the reaction of the amines $R_1$—NH—$R_2$ with tetraiodophthalic anhydride are those of high dielectric constant, i.e. at least 15 and preferably at least 30; for example, dimethylformamide or diethylacetamide, since the reaction proceeds relatively rapidly under these conditions at room temperature. Slightly less polar solvents, for example, methanol or ethanol or other alcohols, may also be used but heating will usually be necessary under these conditions, preferably to the boiling point of the reaction mixture.

The amount of amine employed should, preferably, be at least 2 mols per mol of anhydride in order to form a salt with the carboxyl group but it is usually advantageous to employ an excess of amine although preferably not more than 4 mols per mol of anhydride. Smaller quantities of amines $R_1NHR_2$ can, however, occasionally be used if a tertiary base, for example, trimethylamine is added to the reaction mixture in sufficient quantity to form a salt of the tetraiodophthalamic acid produced.

A further process which may be employed for preparing compounds of the above general formula in which $R_1$ represents a hydrogen atom is to hydrolyse under alkaline conditions, e.g. with caustic soda, followed by acidification if the free acid is desired, an N-substituted tetraiodophthalimide of the general formula:

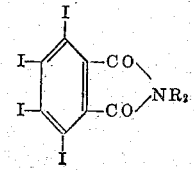

where $R_2$ has the meaning defined above for the case where $R_1$ represents a hydrogen atom. The N-substituted tetraiodophthalimides can themselves be prepared by reaction of an alkali metal salt of tetraiodophthalimide (e.g. the potassium salt) with an alkyl, aryl or aralkyl halide. Alternatively the substituted tetraiodophthalimides may be prepared by reaction of a substituted formamide of the formula $H.CO.NH.R^2$ with tetraiodophthalic anhydride.

Tetraiodophthalic anhydride may be prepared from phthalic anhydride by the method described by Allen, Organic Synthesis, 1947, 27, 78.

In order that the invention may be well understood, we give the following examples by way of illustration only.

EXAMPLE 1

Diethylamine (11.7 ml.) was added to a suspension of tetraiodophthalic anhydride (38.0 g.) in dimethylformamide (58 ml.). An immediate exothermic reaction ensued and the mixture became homogeneous. The solution was diluted with water, acidified with dilute hydrochloric acid to precipitate the crude product which was removed by filtration. Crystallisation from methanol gave 2-carboxy-3:4:5:6-tetraiodobenzo-diethylamide (30.6 g. 72.5%) M.P. 152–160° C. (decomp.). Found: C, 19.7; H, 2.0; I, 70.7; equivalent weight 728. Required for $C_{12}H_{11}O_3NI_4$; C=19.9; H=1.5; I=70.1 equivalent weight 725.

Analogous 2 - carboxy-3:4:5:6-tetraiodobenzamides were prepared by similar means using alternative amines; the amine, temperature of reaction, solvent and ratio of base to anhydride employed in each preparation are shown in the following table.

| Base | Mols per mol anhydride | Solvent | Temperature, °C. | M.P. Product, °C. |
| --- | --- | --- | --- | --- |
| $(CH_3)_2NH$ | 3.9 | Dimethylformamide | 20–25 | 200° dec. |
| $C_2H_5NH_2$ | 2.5 | Methanol | 64 | 249–251° dec. as sodium salt. |
| $(C_2H_5)_2NH$ | 2.0 | Dimethylformamide | 20–25 | 152–160° dec. |
| $C_3H_7NH_2$ | 2.1 | do | 20–25 | 259–263°. |
| $(CH_3)_2CHNH_2$ | 2.0 | do | 20–25 | 170°. |
| $(C_3H_7)_2NH$ | 2.2 | do | 20–25 | 239–243°. |
| $C_4H_9NH_2$ | 3.4 | do | 20–25 | |
| $(C_4H_9)_2NH$ | 2.0 | do | 20–25 | 238–240°. |
| $C_5H_{11}NH_2$ | 2.6 | do | 20–25 | 227–230°. |
| $C_6H_{13}NH_2$ | 2.0 | do | 20–25 | |
| $H_2N(CH_2)_3OH$ | 2.3 | Ethanol | 78 | 240° dec. as sodium salt. |
| $H_2N(CH_2)_2CH(OH)CH_3$ | 2.3 | do | 78 | |
| $H_2NCH(C_2H_5)CH_2OH$ | 2.5 | Dimethylformamide | 20–25 | |
| $H_2NC(CH_2OH)_2CH$ | 2.0 | do | 20–25 | 128–132° dec. |
| $H_2NC(CH_3)_2CH_2OH$ | 3.4 | do | 20–25 | 180° dec. |
| Piperidine | 2.2 | do | 20–25 | |
| Morpholine | 2.3 | Methanol | 64 | |

(Where in the foregoing table melting points are not given, the compounds in question melted and/or decomposed over a range of temperatures and thus no sharp melting point could be obtained.)

EXAMPLE 2

(a) *N-(β-hydroxyethyl)-tetraiodophthalimide*

Tetraiodophthalic anhydride (93 g.) and N-(β-hydroxyethyl)-formamide (240 g.) were stirred and immersed in an oil bath. The temperature was raised rapidly to 155–160° C. and maintained there for 1 hour. The solid started to dissolve as the temperature was raised up to 140° when a large amount of solid was suddenly deposited. The mixture was cooled to room temperature with stirring, filtered, washed with water and ethanol.

Recrystallisation of the precipitate from boiling dioxane yielded N-(β-hydroxyethyl)-tetraiodophthalimide (59.6 g.) M.P. 289.5–292.5° C.

(b) *Sodium salt of β-N-(2-carboxy-3:4:5:6-tetraiodobenzamide) ethanol*

A suspension of N-(β-hydroxyethyl) tetraiodophthalimide (6.94 g.) in dry ethanol (200 ml.) was hydrolysed under reflux for 20 minutes with 2 N alcoholic NaOH (5.25 ml.=1.05 equivalents); the white sodium salt started to crystallise from the boiling ethanol before solution of the yellow starting material was complete.

As soon as qualitative tests showed that all of the alkali had been consumed the hydrolysate was cooled, the crystalline sodium salt filtered, washed with hot dry ethanol, with ether and dried in vacuo. Yield 6.02 g., 82%. (Found: C, 16.7; H, 1.0; I, 69.2; Na, 2.8; required for $C_{10}H_6O_4NI_4Na$: C, 16.3; H, 0.8; I, 69.1; Na, 3.1%).

The new compounds according to the invention can be formulated for administration together with any suitable pharmaceutical carrier. Oral preparations are preferred, particularly tablets, capsules, solutions, syrups, suspensions and the like.

We claim:
1. A compound selected from the group consisting of a compound of the formula:

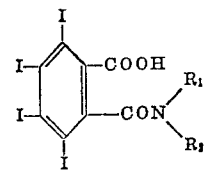

where $R_1$ is selected from the group consisting of hydrogen, $C_1$–$C_8$ alkyl groups and $C_1$–$C_8$ hydroxyalkyl groups and $R_2$ is selected from the group consisting of $C_1$–$C_8$ alkyl groups and $C_1$–$C_8$ hydroxyalkyl groups, a compound having the formula:

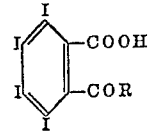

where R is selected from the group consisting of morpholino and piperidino groups and non-toxic basic salts of said compounds.

2. 2-carboxy-3:4:5:6-tetraiodobenzodiethylamide.
3. 2-carboxy-3:4:5:6-tetraiodomorpholide.
4. 2-carboxy-3:4:5:6-tetraiodobenzoisopropylamide.
5. 2-carboxy-3:4:5:6-tetraiodobenzo-n-propylamide.
6. The process as defined in claim 9 in which said inert solvent has a dielectric constant of at least 30.
7. The process as defined in claim 9 in which said inert solvent is selected from the group consisting of dimethylformamide and diethylacetamide.
8. The process as defined in claim 9 in which said inert solvent is selected from the group consisting of methanol and ethanol.
9. A process for the preparation of a compound selected from the group consisting of a compound having the formula:

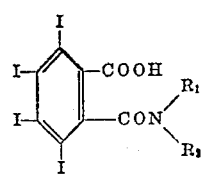

where $R_1$ is selected from the group consisting of hydrogen, $C_1$–$C_8$ alkyl groups and $C_1$–$C_8$ hydroxyalkyl groups and $R_2$ is selected from the group consisting of $C_1$-$C_8$ alkyl groups and $C_1$-$C_8$ hydroxyalkyl groups and a compound having the formula:

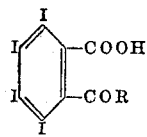

where R is selected from the group consisting of morpholino and piperidino groups, which comprises reacting 3:4:5:6-tetraiodophthalic anhydride with an amine selected from the group consisting of an amine having the formula $R^1$—NH—$R^2$, where $R^1$ and $R^2$ have the above meaning, morpholine and piperidine in an inert solvent for said 3:4:5:6-tetraiodophthalic anhydride, said inert solvent having a dielectric constant of at least 15.

10. A non-toxic basic salt of 2-carboxy-3:4:5:6-tetraiodobenzodiethylamide.

11. A non-toxic basic salt of 2-carboxy-3:4:5:6-tetraiodomorpholide.

12. A non-toxic basic salt of 2-carboxy-3:4:5:6-tetraiodobenzoisopropylamide.

13. A non-toxic basic salt of 2-carboxy-3:4:5:6-tetraiodobenzo-n-propylamide.

References Cited in the file of this patent

UNITED STATES PATENTS 2,247,880     Guerbet _____ July 1, 1941